US005339900A

United States Patent [19]
Clough

[11] Patent Number: 5,339,900
[45] Date of Patent: Aug. 23, 1994

[54] PROCESS FOR RECOVERING HYDROCARBON

[75] Inventor: Thomas J. Clough, Santa Monica, Calif.

[73] Assignee: Ensci, Inc., Pismo Beach, Calif.

[21] Appl. No.: 981,185

[22] Filed: Nov. 24, 1992

[51] Int. Cl.$^5$ ............................................. E21B 43/22
[52] U.S. Cl. .................................... 166/274; 166/279
[58] Field of Search ........................ 166/274, 279, 310

[56] References Cited

U.S. PATENT DOCUMENTS

| | | | |
|---|---|---|---|
| 4,216,078 | 8/1980 | Plumlee et al. | 208/264 X |
| 4,846,274 | 11/1989 | Clough | 166/270 |
| 5,114,599 | 5/1992 | Debons et al. | 166/274 X |
| 5,230,814 | 7/1993 | Naae et al. | 166/274 X |

*Primary Examiner*—William P. Neuder
*Attorney, Agent, or Firm*—Frank J. Uxz, Jr.

[57] ABSTRACT

A process for recovering hydrocarbons from a subterranean hydrocarbon-bearing reservoir comprising:
contacting the reservoir with at least one plant derived aromatic containing component having ortho-quinone functionality in an amount effective to promote the chemical modification of at least one component of the hydrocarbons in the reservoir and optimally at least one additional oxidant in an amount effective to do at least one of the following: maintain at least partially the promoting activity of the plant derived aromatic component; produce at least a portion of plant derived aromatic component; and oxidize at least a portion of a component of the hydrocarbons, the contacting occurring at conditions effective to chemically modify the component of the hydrocarbons in the reservoir; and recovering hydrocarbons from the reservoir.

20 Claims, No Drawings

PROCESS FOR RECOVERING HYDROCARBON

BACKGROUND OF THE INVENTION

This invention relates to a process for recovering hydrocarbons, such as petroleum and the like. More particularly, the invention relates to processes wherein hydrocarbons are recovered from subterranean hydrocarbon-bearing formations, i.e., reservoirs.

Producing petroleum from subterranean reservoirs has become increasingly difficult. A large portion of the original crude petroleum in place in many subterranean hydrocarbon-bearing reservoirs remains in place after primary production and water flooding. As oil reserves dwindle and exploration for new discoveries becomes more difficult and costly, the use of enhanced oil recovery (EOR) techniques on previously discovered resources will play an increasingly important role in the overall production of crude petroleum.

One EOR technique which has been used involves surfactant injection. However, such surfactants are relatively costly and are not cost effective in producing increased quantities of hydrocarbon. A new EOR process would be beneficial.

SUMMARY OF THE INVENTION

A new process for recovering hydrocarbons which involves modifying at least one component of a hydrocarbon-based material has been discovered. This process provides an effective, convenient and economical approach to chemically modifying, preferably oxidizing, cracking, demetallizing, forming surfactants from, or altering the viscosity of or the like, one or more components of a hydrocarbon-based material, preferably petroleum.

One broad aspect of the present invention is directed to a process for recovering hydrocarbons from a subterranean hydrocarbon-bearing reservoir. In one embodiment, the invention comprises contacting the reservoir with at least one plant derived aromatic component having ortho-quinone functionality at conditions effective to chemically modify, preferably oxidize, at least one component of the hydrocarbons n the reservoir; and recovering hydrocarbons from the reservoir. The plant derived aromatic containing component is present in an amount effective to promote the chemical modification of the hydrocarbon component. The plant derived aromatic containing component and mixtures thereof are preferably substantially soluble at the conditions of use.

In another broad aspect, the present process comprises contacting a subterranean hydrocarbon-bearing reservoir with at least one plant derived aromatic containing component having ortho-quinone functionality in an amount effective to promote the chemical modification of at least one component of the hydrocarbons in the reservoir, and at least one additional oxidant at conditions effective to chemically modify one or more of such components; and recovering hydrocarbons from the reservoir. The additional oxidant in these embodiments is preferably an oxygen-containing component, in an amount effective to do at least one of the following: maintain at least partially the promoting activity of the plant derived aromatic containing component; produce at least a portion of the plant derived aromatic containing component complex; and oxidize at least a portion of the hydrocarbon in the reservoir. The contacting occurs in the presence of the additional oxidant at conditions effective to chemically modify the component of the hydrocarbons in the reservoir, and hydrocarbons are recovered from the reservoir.

The present process advantageously results in the chemical modification of one or more components of the hydrocarbons in the subterranean reservoir. Such chemical modification, preferably oxidation, of such component or components often results in enhanced recovery of hydrocarbons, e.g., more efficient and/or higher effective hydrocarbon yields, from the reservoir. For example, the present contacting may advantageously result in the in situ generation of surfactants, which surfactants aid in releasing hydrocarbons from the non-hydrocarbon-based portion of the subterranean reservoir, e.g., through emulsification, reduction of interfacial tension, and/or wetability changes, for example, oil wet to water wet. Further, oxidative cracking and/or oxidative viscosity reduction of crude petroleum, for example heavy crude oil, tends to increase the mobility of the petroleum through the subterranean reservoir, and to ultimately increase the recovery of petroleum. In certain aspects of this invention, oxidation emulsification can increase viscosity, thereby improving mobility control and better reservoir sweep efficiency for recovery of oil. The present invention can provide a cost effective approach to the enhanced recovery of hydrocarbons from subterranean reservoirs.

DETAILED DESCRIPTION OF THE INVENTION

The present process is effective to recover hydrocarbons from a subterranean hydrocarbon-bearing reservoir, preferably having at least one injection means, e.g., an injection well, in fluid communication with at least one production means, e.g., a production well.

In one embodiment of the invention, the process comprises: contacting the hydrocarbons in the reservoir with at least one plant derived aromatic containing component in an amount effective to promote the chemical modification of at least one component of the hydrocarbons in the reservoir and optionally at least one additional oxidant and mixtures thereof; and recovering hydrocarbons from the reservoir. In one particularly useful embodiment, the process comprises injecting into the reservoir, preferably through the injection means, one or more liquid compositions or media, more preferably aqueous liquid media, including one or more of the plant derived aromatic containing component described above; and recovering hydrocarbons from the reservoir, preferably through the production means. A drive fluid is preferably injected into the reservoir, preferably through the injection means, to urge hydrocarbons in the reservoir toward the production means. This drive fluid may be separate and apart from the liquid medium described herein as contacting the reservoir. However, it is preferred that the liquid medium used to contact the reservoir also acts as a drive fluid, i.e., to urge hydrocarbons in the reservoir toward the production means.

The present process has been found to provide for recovery of hydrocarbons, e.g., crude petroleum, from subterranean hydrocarbon-bearing reservoirs. This enhanced oil recovery or EOR process is relatively inexpensive and cost effective for hydrocarbon recovery. For example, the plant derived aromatic containing component and oxidants, e.g., as described herein, which may be employed are relatively inexpensive, available, and/or easy to produce.

The term "chemical modification" as used herein refers to a change in one or more of the components of the hydrocarbons in the subterranean reservoir, which change preferably results from the chemical reaction, more preferably oxidation, of one or more of such components. In certain instances, no specific chemical reaction can be pointed to account for the change in the component or components. For example, the hydrocarbons in the reservoir may become more easily emulsifiable, with water, as the result of the present contacting. This improved emulsifiability is a chemical modification as that term is used herein. Also, the chemical modification may occur with regard to the carbon and/or hydrogen portions of the hydrocarbons in the reservoir and/or to the other portions, e.g., such as contained sulfur, nitrogen, oxygen, metals or the like, of such hydrocarbons in the reservoir and/or acts to condition or enhance rock wetability changes to water wet and/or acts to improve mobility control and sweep efficiency. The present contacting step preferably produces surfactants in the reservoir and/or acts to reduce the viscosity of the hydrocarbons in the reservoir and/or acts to condition or enhance rock wetability changes to water wet and/or acts to improve mobility control sweep efficiency. The present contacting preferably liberates at least a portion of the hydrocarbons in the reservoir. That is, an increased amount of hydrocarbons is preferably recovered from the reservoir using the present contacting step relative to practicing a similar process without the present contacting step.

One embodiment of the present process involves contacting a subterranean hydrocarbon-bearing reservoir with at least one plant derived aromatic containing component having ortho quinone functionality, preferably selected from a component which has one or more water solubilizing groups attached to the component more preferably as a water soluble salt such as an alkali metal salt. The plant derived aromatic containing component having ortho-quinone functionality, hereinafter referred to as ortho-quinone component, and mixtures thereof is present in an amount effective to at least promote the chemical modification of the hydrocarbon material. The various embodiments of this invention can be practiced singly or in any combination of embodiments, with selection and optimization generally being a function of the crude oil type and desired hydrocarbon recovered.

The benefits resulting from the process of this invention, e.g., improved recovery of desired hydrocarbon and as a function of time, are substantial. Without wishing to limit the invention to any specific theory of operation, it is believed that many of such benefits result from the direct and/or indirect chemical modification, i.e., the effect of one or more of the above o-quinone containing components for example is an oxidation effect which promotes the recovery of hydrocarbons from such reservoirs. It is believed that the o-quinone containing components can interact directly and/or indirectly with the hydrocarbons by for example direct oxidation of the hydrocarbons and/or by the generation of an active oxidant specie which interacts with the hydrocarbon material to promote improved hydrocarbon recovery.

Another embodiment of this invention is the obtaining of such benefits through a catalytic effect by the ortho-quinone containing components. Without wishing to limit the invention to any specific of operation, it is believed that the ortho-quinone containing component during its interaction with the hydrocarbon material is reduced and is subsequently regenerated by an additional oxidant such as an active oxygen specie, such as oxygen. During a given period of time in which the hydrocarbon is contacted with the ortho-quinone containing component and an additional oxidant, the ortho-quinone containing component can cycle between an oxidized and reduced state, i.e., the component is regenerated, thereby allowing the chemical modification of the hydrocarbon material to be carried out with an amount of ortho-quinone containing component less than would be required without the regeneration of such component. The use of such lesser amounts of the ortho-quinone containing component, i.e., a catalytic amount, allows for improved process efficiencies.

The promoting effect of the presently useful ortho-quinone redox couples allows the process to be effective, e.g., from the standpoint of improved recovery of desired hydrocarbon as a function of time, on a wide variety of difficult to process reservoirs.

Improved yields or recoveries of hydrocarbons can often be achieved under less severe and costly conditions by practicing the present process, especially when compared to recovering hydrocarbon from reservoirs without utilizing the process of this invention. The present process is relatively easy to operate and control. Relatively low concentrations of the o-quinone containing components are used and relatively mild process conditions may be employed. Thus, the present invention can provide a cost effective approach to hydrocarbon recovery from reservoirs.

DETAILED DESCRIPTION OF THE INVENTION

The present process provides substantial advantages. For example, the use of at least one of certain promoting o-quinone containing components, particularly lignin and tannin derived components particularly having water solubilizing groups such as the sodium salt and more particularly in a redox cycling catalytic amount in the presence of an additional oxidant provides for improved contacting, e.g., to increase the rate of hydrocarbon material chemical modification and ultimately to improve the yield of hydrocarbon recovered. The improved rate of hydrocarbon material chemical modification also results in significant process and cost economies. In addition, effective hydrocarbon recoveries can be achieved utilizing crude oil, depleted, water flooded (heretofore difficult to process) crude oil.

The process of the present invention is useful for hydrocarbon recovery from reservoirs, as defined herein. The present process employs at least one of certain o-quinone containing components. Such components may include alkali and/or alkaline earth metals and/or ammonium salts provided that they also contain o-quinone containing functionality which is effective in the present invention. Such o-quinone containing components are present during the contacting step in an amount effective to at least promote the chemical modification of the hydrocarbon material in the crude oil. Thus, such ortho quinone containing components are present in an amount effective to promote such chemical modification and/or to oxidize the hydrocarbon material in the crude oil to enhance and/or promote recovery.

The presently useful plant derived aromatic components having o-quinone functionality are preferably selected from the group consisting of one or more lignin derived components, one or more tannin derived components and mixtures thereof. The lignin and tannin derived components may be selected from natural materials or lignin and tannin containing materials from various lignin and tannin manufacturing processes. As set forth above, preferred components having ortho-quinone functionality are those that also have water solubilizing functionality particularly as a water solubilizing salt particularly at alkaline pH.

Lignin in higher plants is formed by complex enzymatic processes which produce substituted phenolic compounds. Lignin are a family of three-dimensional polymers which bind together the cellulose fibers in higher plants. Lignin can provide rigidity to the plant structure and, being in general resistant to chemical and biological attack, helps plants from decay. Lignin is distributed widely throughout the plant kingdom. Plant lignin are generally divided into three broad classes which are commonly called softwood, hardwood and grass or annual plant lignin. The latter also includes such plants as bamboo and palm. Thus lignin can be released by chemical or mechanical disintegration from a wide variety of plant tissues including, as set forth above, softwood (coniferous), hardwood (deciduous) or from bark, cambium, sapwood or heartwood. In addition, lignin can be released from jute, rice hulls, peanut shells, barley, straw, begasse, coconut shells, alfalfa, pine needles, oat and wheat straw, corn cobs and various other plant materials.

Although the exact structure of lignin is unknown, plant lignin from certain trees are considered to be a polymeric material almost entirely made up of phenylpropane units that exist as branched chains of crosslinked structures. In lignin from softwood trees, nearly all the aromatic rings have one methoxyl group in position three from the propyl side chain.

The phenolic precursors of hardwood lignin trees contain methoxyl groups in one or both of the positions adjacent to the phenolic hydroxyl; however, in softwoods the precursors are generally substituted at only one position and occasionally not at all. As a result of this softwood lignin contains about twice as many reactive sites on the aromatic rings and contain a higher proportion of carbon-carbon linkages between aromatic rings. A chemical structure which incorporates various chemical groupings found in, for example, spruce native lignin in their existing ratios shows various joined coniferyl units with approximately one-third of the units still having a free phenolic group and most having an aliphatic alcohol group in the side chain. A majority of the phenolic groups are generally in etherified form, i.e., a phenolic polyether, and have a number average molecular weight of generally about 2000 to about 10,000.

There are two major pulping processes which promote lignin solubility, each using a different approach. In sulfite processes, the lignin molecule is attacked by sulfonate anions generally in the presence of sodium, ammonium, magnesium or calcium cations and at varying pH values to produce a range of pulps with varying lignin and hemicellulose contents. The lignin molecule in this process becomes sulfonated and thus water soluble. Alternatively, in alkaline processes, the lignin molecule is depolymerized by alkaline hydrolysis of the ether bonds between the aromatic units.

Lignosulfonate products are generally produced from wood by the acid bisulfite pulping process and the kraft process. In the acid sulfite pulping process, the lignin in, for example, wood chips is subjected to reaction with an aqueous bisulfite salt at elevated temperature and pressure. During the process, the lignin is rendered water-soluble by a combination of depolymerization and sulfonation. Both cleavage and sulfonation occur almost entirely at positions immediately adjacent to the aromatic rings. Cleavage of this carbon-oxygen bond destroys one of the linkages common to both hardwood and softwood lignin.

The resulting lignin sulfonate is dissolved in the spent sulfite pulping liquor along with a variety of carbohydrate compounds which are primarily formed by degradation of the hemicellulose components of wood. The chemical composition of hemicellulose varies considerably with species of tree, even within the general categories of hardwoods and softwoods. The degradation products, therefore, also vary widely and can include glucose, mannose, galactose, xylose, arabinose and rhamnose in proportions which are determined largely by the wood source. These sugars usually account for 20–25% of the total spent sulfite liquor solids. In addition, ash can be present in the liquor solids.

In sulfite pulping, generally up to about one-half of the coniferyl building units of the lignin molecule add sulfonate groups with varying ease. The locations of the attacks are generally the highly active benzyl alcohol or benzyl ether groups of the lignin. These oxygen containing groupings on the carbon adjacent to the aromatic ring are very labile and are substituted in the pulping process by the highly polar sulfonate groups. If the benzyl alcohol or ether is attached to a free phenolic unit, a sulfonate group is more readily introduced than when the benzyl group is attached to a phenol ether. Sulfonation apparently also occurs on side chain carbons adjacent to carbonyl groups. Thus, through addition of solvating groups to the high polymer lignin and through low order acid hydrolysis and splitting of the lignin molecule, solution of the lignin is achieved.

Lignosulfonates are generally classified as polydisperse macromolecular polymers with molecular weights ranging from several hundred to more than one hundred thousand. The phenylpropane structural units of lignosulfonates can be linked together in many different patterns by carbon-carbon and ether linkages. Most of the sulfonate groups in lignosulfonates are thought to be joined to the alpha carbons of the side chain, with about one sulfonate radical for two phenylpropane units. Primary hydroxyl groups are found on many of the phenylpropane units while others have various carbonyl groups.

Lignosulfonates from the sulfite process can generally have a weight average molecular weight up to about 100,000. The calcium lignosulfonate can be used as starting materials for other products due to the ease with which the calcium cation may be replaced with other cations to form the appropriate soluble sulfate salts, such as sodium, ammonium and potassium.

The other basic process to solubilize lignin is the alkaline pulping processes. The most predominate lignin interlinkage is the beta ether type, and this is cleaved by alkali to form smaller molecular size phenols which tend to dissolve in water as the sodium phenolate salts. In phenyl coumarin type interlinkages, alkali attack frees the phenolic group for solubilizing salt formation, but concurrent formaldehyde loss from the side chain can produce a double bond between the two benzene rings to form phenolic stilbene portions in the alkali lignin.

In the kraft process, pulping liquor which contains from about 20 to about 30 wt % sodium sulfide in a mixture with sodium hydroxide is used. Whereas, sodium hydroxide alone will depolymerize the lignin to soluble form, the hydroxide can also split the ether groups of the wood carbohydrates causing their undesired dissolution. A sodium hydroxide-sodium sulfite mixture is generally more effective in achieving continued lignin dissolution while having comparable effects on the carbohydrate dissolution. Apparently, sulfide not only promotes more rapid splitting of the lignin ether groups, but introduction of sulfur in the benzyl alcohol position may inhibit concurrent polymerizing reactions.

The location of the alkaline attack on the native lignin generally results in the ether groups being split to form smaller molecular size free phenols. Typically about 5 to 10% of the lignin can be decomposed all the way down to monomeric phenols in the liquor, while the remainder is solubilized as higher molecular weight portions of the gross lignin molecule. The potential ether split and loss of formaldehyde can produce stilbene type structures. Comparable dehydration and formaldehyde loss can produce unsaturated ethers. In addition, carboxyl groups are also found in kraft lignin.

In alkaline hydrolysis, the phenolic group in the lignin molecule are generally doubled so that they are present on a majority of the units.

By proper two-stage acidification, coagulation and purification, there can be obtained a reproducible kraft lignin from pine black liquor with a structure and number average molecular weight approximately about 2000 to about 12,000 and a weight average molecular weight of about 2500 to about 10,000. Based upon the mode of alkaline attack, a generalized structure can be designated as a plurality of aromatic units as polyelectrolyte with phenolic groups, carboxyl groups, keto groups, aliphatic hydroxyl, and double bonds.

The processed lignin can be further processed to modify various properties of the lignin such as solubility in an aqueous medium, for example, by substituent group modifications such as sulfonic, hydroxyl, polyhydroxyl and further reactions with polyhydroxy aromatic compounds, particularly catechol containing compounds. Such modifications, including examples as set forth above, are included within the scope of this invention.

Lignin derived products can undergo physical and chemical modification by modification of sulfite liquor, sulfonated lignin, and kraft lignin. Depending on the optimum properties required, lignin derived products, including lignosulfonates, can be processed by one or more methods including conversion to other salts, polymerization, classification of molecular weights, and oxidation-reduction of macromolecules. The solubility, absorption, electrolytic, and complexing characteristics of such products can be modified based upon their molecular structure shape and size, i.e., the type, quantity and location of functional groups including sulfonic, sulfonate, sodium sulfonate, hydroxyl, poly hydroxy including di hydroxy benzene such as catechol, carbonyl, methoxy, carboxyl and chloride.

As set forth above, the preferred lignin derived products having ortho-quinone functionality are those having water solubilizing groups, particularly sulfonate, carboxylate, phenolate groups and the like which enhance the solubility characteristics of such components particularly at alkaline pH. In addition, it is preferred to optimize the amount of ortho-quinone functionality in the lignin containing component, preferably during processing such as during the sulfite or kraft pulping process. During such processing, catechol functionality is believed to be introduced by demethylation during the depolymerization and/or hydrolysis and other reactions of the lignin raw material. The formation of catechol functionality is believed to be enhanced by both temperature and alkaline pH particularly at increased process severities. As set forth above, the lignin containing component can be further reacted to enhance the formation of catechol functionality. The catechol functionality can be converted to the ortho-quinone functionality using, for example, an active oxygen species, such as oxygen. As used herein, the term plant derived aromatic containing components includes both components having ortho-quinone functionality and/or catechol functionality which can be converted to ortho quinone functionality, preferably under the in situ and external regeneration process conditions of this invention. In addition, various substituent groups can be introduced onto the catechol functionality group in order to modify the oxidation potential and regeneration of the reduced ortho-quinone functionality for overall effectiveness in the chemical modification of the hydrocarbon. In general, substituents on the quinone nucleus such as halogens particularly chloride, CN, $SO_3Na$ in general raise the potential of the ortho-quinone functionality, whereas alkyl, i.e., methyl, methoxy, hydroxy, and various amine and alkyl substituted amine groups in general decrease the oxidation potential. As set forth above, the optimum oxidation potential and the chemical modification and/or oxidizing power of the ortho-quinone component is a function of the hydrocarbon, the process conditions particularly the pH, and the regeneration of the ortho-quinone component, whether such regeneration be in situ such as when the ortho-quinone component is utilized in catalytic amounts or when larger amounts of the ortho-quinone component are utilized. The ortho-quinone component can be regenerated, for example, externally and recycled to the process. In general, it is preferred to have an oxidation potential of the ortho-quinone functionality which allows for reasonable process efficiencies, i.e., chemical modification of the hydrocarbons, so as to improve overall crude oil liberation and to provide ease of regeneration for the continued chemical modification of the hydrocarbons by in situ and/or external regeneration.

Typical examples of lignin derived products which are suitable to provide the o-quinone oxidants of this invention are, for example, the treated or untreated spent liquors (i.e., containing the desired effluent lignin product solids) obtained from wood or other plant conversion, for example, the waste pulp liquor, or modified lignin products, such as by pyrolysis, reduction modification or ozonation of the aforementioned lignin individual products including spent liquors. The alkaline oxidized, hydrolyzed, partially desulfonated and subsequently resulfonated lignosulfonates are also suitable.

Certain of these lignin containing components are obtained in waste pulping liquors derived from softwood and hardwood starting materials. Lignin containing components may be additionally sulfonated or sulfomethylated.

Other lignin containing products are the ozonated lignosulfonates obtained from ozonation of the aforementioned ligno products, including treated or untreated spent liquors. In addition, purified lignin containing products from which the sugars and other saccharide constituents have been partially or totally removed such as by fermentation or, additionally, inorganic constituents have also been partially or totally removed are also useful.

As a further alternative, the lignin containing components may be one of the desulfonated lignosulfonates (including substantially pure lignosulfonate compositions) which are generally obtained by catalytic—frequently alkaline—oxidation processes conducted under conditions of high temperature and pressure, oftentimes with accompanying hydrolysis.

As set forth above, further modification of the lignin derived products are included within the scope of this invention and include the reaction of the foregoing lignin containing product materials with, for example, a halide, a halocarboxlyic acid or a sulfonating agent. In addition, further reactions can include one or more combinations of alkoxylation, sulfation, alkoxysulfation, alkylation or sulfomethylation. Any suitable sulfonation reagents may be used for sulfonation reaction. When straight sulfonation is desired, it is advantageously accomplished with an alkali metal (such as sodium) sulfite or sulfur dioxide. Sulfoalkylation can be accomplished with mixtures of an appropriate lower alkyl aldehyde and a bisulfite.

Other lignin containing compounds which may be used in the practice of this invention are the derivatives of an oxidized, partially desulfonated lignosulfonate obtained in the spent oxidized liquor from a dilute vanillin oxidized softwood or hardwood, spent sulfite liquor by acidification prior to vanillin extraction with an organic solvent and which can be further treated with, for example, sodium bisulfite and an aldehyde, preferably formaldehyde, at elevated temperature to sulfoalkylate, and/or sulfomethlate, the desulfonated lignosulfonate molecules.

Tannins occur in many plants and are in general separated by extraction. A typical example of tannin compound includes tree bark extract such as quebracho, hemlock and redwood extracts. The tannins are aromatic and are obtained from various plants and trees. Particularly preferred tannins are the condensed tannins which have catechol functionality, i.e., the catechol tannins which can generate and/or be converted to ortho-quinone functionality.

As set forth above, the activity/regeneration of the o-quinone containing component can be affected by the pH of the aqueous composition employed in the present contacting step. Some activity of the o-quinone component may have to be sacrificed because of the pH of the aqueous composition during the contacting, which pH may be preferred for various other processing reasons. The particular pH employed can also affect the salt form of the o-quinone containing component employed, and such salts are o-quinone containing components within the scope of this invention.

As set forth above, the ortho-quinone containing components are effective in a catalytic and/or promoting amount and/or chemical modifying, particularly in the presence of an additional active oxidant species such as oxygen, and such combination of component plus additional oxidant allows the ortho-quinone containing component to cycle between an ortho-quinone functionality and a reduced catechol functionality. Thus, the ortho-quinone containing component can interact with the hydrocarbon followed by regeneration, i.e., reoxidation of the catechol functionality. After regeneration, the ortho-quinone functionality can further interact with the hydrocarbon. Thus the ability to rapidly cycle between the ortho-quinone and catechol states produces a cycling component which can oxidize and be regenerated, thereby producing a series of oxidations/regenerations during contacting of the hydrocarbon. As set forth above, the ortho-quinone containing component can be modified such as through substituent groups on the aromatic ring to optimize activity for both oxidation and regeneration, i.e., effective oxidation of the hydrocarbon with effective regeneration, preferably rapid regeneration. The optimization provides for overall improved process effectiveness. Thus substituant groups such as methoxy, sulfonate, hydroxy, chloride and cyanide can be used to modify and enhance the overall oxidation regeneration effectiveness of the ortho-quinone containing components. Thus, it is preferred that the ortho-quinone containing component cycle rapidly and produce a number of cycles, for example at least about 4 cycles and generally from about 5 cycles up to about 1000 cycles or more or up to about 100 cycles, the number of cycles in general being such number which effectively allows for an improvement in crude oil. The number of cycles in general will be a function of the crude oil, reservoir characteristics and remaining original oil in place, the concentration of the ortho-quinone containing component, as well as other impurities and components in the reservoir which may be susceptible to oxidation. By the term "cycle" is meant a single oxidation regeneration cycle, commonly referred to in promoter catalyst terms as "one turnover."

The specific amount of the o-quinone containing component employed may vary over a wide range and depends, for example, on the crude oil and/or the o-quinone containing component employed, and on the degree of oxidation desired. The weight percent of o-quinone functionality, based upon the molecular weight of the ortho-quinone component, can vary over a wide range and in general represents a weight percent of from at least about 1 weight percent to about 40 weight percent of the weight of the ortho-quinone containing component, i.e., for those compounds containing ortho-quinone functionality, more preferably from at least about 2 to about 30 weight percent and still more preferably from at least about 5 weight percent to about 25 weight percent. By ortho-quinone functionality is meant an ortho-quinone functionality having a molecular weight of about 108 and the relationship of that molecular weight from a weight percent standpoint to the total molecular weight of the compound. For example, for certain components the total molecular weight can be represented by the total molecular weight of the phenyl propane units, including substituents or such phenyl propane units. Since the ortho-quinone containing components in general will be mixtures, the above preferred ranges apply to the individual ortho-quinone containing components within the mixture. Preferred molecular weight ranges are from about 1500 to about 75,000, more preferably from about 2000 to about 10,000 and still more preferably from about 2000 to about 6000.

In certain embodiments, preferred concentrations of the ortho-quinone containing component are in the range of about 0.01 to about 4%, more preferably from about 0.05 to about 2% by weight based upon the aqueous composition employed in the contacting, calculated as o-quinone containing component. It is generally convenient to provide the o-quinone containing compound in combination with, preferably in solution in, the aqueous composition used in the contacting step. As set forth above, it is preferred that the ortho-quinone containing component be present in an effective catalytic and/or promoting amount, particularly within the ranges set forth above. In addition, as set forth above, it is preferred that the ortho-quinone containing component be water soluble at the concentration and conditions at which it is effective for carrying out the process of this invention.

The o-quinone containing component can be added to the contacting step and/or can be formed in situ prior to or in the course of the contacting.

The present contacting preferably takes place in the presence of an aqueous liquid medium or composition. The ortho-quinone containing component, which is preferably soluble in the aqueous medium, may be added to the aqueous medium prior to the contacting. Any suitable, aqueous medium can be employed in the present process. The pH of the aqueous medium may vary and in general a neutral or basic medium, preferably a basic or alkaline medium can be employed depending, for example, on the reservoir being treated, the specific ortho-quinone containing component being employed, and the presence or absence of other components or entities such as soluble metals during the contacting. Preferably, the pH of the aqueous composition is in the range of about 7 to about 13, preferably from about 9 to about 13 and, still more preferably, from about 10 to about 12. The pH of the aqueous medium may be adjusted or maintained, e.g., during the contacting step, for example, by adding acid and/or base.

The aqueous medium comprises water, preferably a major amount of water. The medium is preferably substantially free of ions and other entities which have a substantial detrimental effect on the present process. Various bases or combination of bases may be included in, or added to, the medium to provide the desired pH. For example, alkali metal hydroxides, sodium and potassium, alkaline earth metal hydroxides, silicates, metal salts which decompose (in the aqueous medium) to form such bases, their corresponding carbonates, preferably sodium carbonate, mixtures thereof and the like may be employed. It is preferred to use an hydroxide or silicate as the base, preferably sodium hydroxide or sodium ortho silicate. The quantity and composition of the aqueous medium may be selected in accordance with the requirements of any given reservoir to be treated and as may be found advantageous for any given mode applying the present process in practice. In carrying out the present process, one or more surfactants, polymers and/or metal catalysts can be included in, e.g., added to, the aqueous composition (in addition to the ortho-quinone containing components) to further enhance rates and/or yields. Examples of such agents include hydrocarbon sulfonates, lignosulfonates, alkyl substituted succinic anhydrides, alcohol ethoxylates and the like. Typical examples of metal oxidation catalysts are iron, copper, cobalt, vanadium, and manganese components which are soluble in catalytically effective amounts in an aqueous medium, preferably selected from iron complexes with ligands, copper complexes with ligands, vanadium components with ligands, manganese components with ligands, and mixtures thereof.

The amount of ortho-quinone containing components employed may vary widely provided that such amount is effective to function as described herein. Such ortho-quinone containing components are preferably present during said contacting in an amount less than about 5%, more preferably in the range of about 0.01% to about 4% by weight, and still more preferably from about 0.05% to about 2%, calculated as o-quinone containing material, based on the amount of ore present and/or liquid present during contacting such as a solution used in an agitated leach or during a vat or heap leach. One of the substantial advantages of the present process is that large amounts of ortho-quinone containing components are not required although adjustments can be made depending on the various reservoir crude oil characteristics. Thus, in order to reduce costs still further while achieving benefits of the present invention, low concentrations of such materials are preferably selected.

The present contacting can be conducted in the presence of at least one additional active oxidant species other than the ortho-quinone containing component. The oxidant is present in an amount effective to do at least one of the following: maintain or form the ortho-quinone containing component, or produce or regenerate at least a portion of the ortho-quinone containing component. The oxidant or oxidants may be present during the contacting step and/or during a separate step to form and/or regenerate the ortho-quinone containing component. Any suitable oxidant capable of performing one or more of the above-noted functions may be employed. The oxidant is preferably selected from the group consisting of molecular oxygen (e.g. in the form of air, dilute or enriched air, or other mixtures with nitrogen or carbon dioxide), single oxygen, ozone, inorganic oxidant components containing oxygen and at least one second metal and mixtures thereof. More preferably, the oxidant is selected from the group consisting of molecular oxygen, oxidant components containing oxygen and at least one second metal and mixtures thereof. Still more preferably, the oxidant is oxygen. The oxidant can involve a mixture of oxidants such as an oxidant component containing oxygen and at least one second metal, and molecular oxygen in an amount effective to maintain the ortho-quinone containing component in the desired oxidized state or in the case of a reducible metal oxidant, to reoxidize such oxidant by, for example, molecular oxygen. Care should be exercised to avoid large excesses of the oxidant to as to minimize reactions that could solubilize deleterious elements.

By reducible metal oxidant is meant a metal component preferably manganese which is capable of being chemically reduced at the conditions of the present contacting. Preferably, metal oxidant includes manganese, more preferably a major amount of manganese, in at least one of the 3+ and 4+ oxidation states. Particularly useful metal oxidants include manganese dioxide, i.e., $MnO_2$, soluble manganese in the (3+) oxidation state and mixtures thereof. The metal oxidant can be provided from any suitable source, such as manganese halide and the like. The manganese component originally present may be subjected to oxidation, e.g., by contact with air and/or other manganese oxidant in the presence of base, in order to obtain and/or regenerate the presently useful metal oxide. The amount employed may vary over a wide range depending on, for example, the specific metal oxidant being employed, what ortho-quinone component is being used, what, if any, oxidant is being used, the specific subterranean hydrocarbon-bearing reservoir being treated, and the type and degree of chemical modification desired. Preferably, the amount of metal oxidant included in the present contacting step is sufficient to maintain the desired amount of ortho-quinone oxidation state during the contacting. Substantial excesses of metal oxidant should be avoided since such excesses may result in material separation and handling problems, and may even result in reduced recovery of hydrocarbons. In one embodiment, the reducible manganese component or components are substantially soluble in the liquid medium at the contacting conditions. Such substantially soluble manganese components are preferably selected form manganese ligand (3+) complexes. A particularly preferred oxidant comprises a mixture of molecular oxygen with carbon dioxide in an amount effective to promote the molecular oxygen access to and contact with the hydrocarbons in the reservoir. The use of carbon dioxide has been found to enhance the chemical modification, e.g., oxidation, of the component or components of the oxidation, of the component or components of the hydrocarbon in the reservoir. Although carbon dioxide may be used alone, i.e., substantially without an oxidant, it is preferably employed with an oxidant, and more preferably with molecular oxygen. When used with molecular oxygen, the carbon dioxide is preferably present in an amount in the range of about 1.0 to about 1000 moles of carbon dioxide per mole of molecular oxygen. Care should be exercised to avoid using carbon dioxide in amounts which substantially detrimentally affect the pH of the contacting liquid medium, e.g., reduce the pH of the liquid medium below the desired level of solubility useful for plant derived aromatic containing component hydrocarbon modification, e.g., oxidation, activity.

The present contacting results in at least a portion of the ortho-quinone containing component being chemically reduced to form a reduced catechol containing component. This reduced component can exit the contacting zone and be used on a once-through basis, or may be regenerated to an ortho-quinone containing component as set forth above, in situ or externally and recycled to the reservoir. In the case of a once-through basis, it is preferred to minimize the amount of reduced component exiting with the produced water and crude oil. Such regeneration can be done by oxidizing the reduced component or with molecular oxygen, in situ or external, at ambient and/or elevated temperatures to convert the reduced component to an ortho-quinone containing component.

The amount of oxidant employed in the present invention is chosen to facilitate the desired functioning of the present contacting step. Without limiting the invention to any specific theory or mechanism of operation, it may be postulated that when oxidant is employed such oxidant acts in conjunction with the ortho-quinone containing component to chemically modify at least a portion of the hydrocarbon. Although the ortho-quinone containing component takes an active part in the oxidation and recovery functioning, when oxidant is employed, such ortho-quinone containing component preferably acts as a catalyst or promoter and may be, and preferably is, used more than once in the present contacting step, e.g., is recycled to the present contacting step or is employed to contact more than one increment of the oil in place.

The amount of oxidant employed preferably acts to facilitate the desired oxidation of the reduced ortho-quinone containing component. The specific amount of oxidant employed varies depending on many factors, for example, the reservoir being treated, the specific ortho-quinone containing component and oxidant being employed, and the specific degree of oxidation. Preferably, the amount of oxidant employed in the present contacting step should be sufficient to provide the chemical modification to the desired degree. Substantial excesses of additional oxidant should be avoided since such excesses may result in reduced recovery of the desired crude oil.

Although one or more of the oxidants may be utilized in a separate oxidation or regeneration step, it is preferred that such oxidants, and in particular oxygen, be present and effective during the contacting step of the present invention.

One important feature of the present invention is that it may be effectively practiced in the presence of brine which is often present in subterranean reservoirs, for example, after conventional water flooding. Thus, no "special" pretreatment of the reservoir is needed to employ the present process. In addition, the combination of brine and ortho-quinone component can improve overall process effectiveness, such as reactivity, in the chemical modification of hydrocarbons. Thus, increased yields of hydrocarbons can be recovered from reservoirs whether they have or have not been previously water flooded and/or subjected to one or more other EOR processes. In addition, in certain instances, the present process may be advantageously used on a reservoir where primary recovery processing has not been employed.

Any suitable drive fluid may be used in the present process in combination with the liquid medium. For example, the drive fluid may be selected from the group consisting of methane, ethane, propane, natural gas, nitrogen, air, combustion flue gas, carbon dioxide, water, brine, and mixtures thereof. In one embodiment, the drive fluid is preferably an aqueous composition. The drive fluid preferably includes a source of oxygen in an amount effective to provide at least a portion of the oxidant, as described herein. The choice of a specific drive fluid for use in the present invention depends on various factors, for example, the specific liquid medium being used, and the specific reservoir and reservoir conditions to be encountered. The amount of drive fluid is such to urge or push the liquid medium toward the production means, e.g., production well or wells. The amount of drive fluid injected may range up to 100% or more of the reservoir or reservoir pre volume, based on the volume of the drive fluid at the conditions present in the reservoir reservoir. The rate of drive fluid injection into the reservoir or reservoir is preferably such that the liquid medium sweeps or moves through the reservoir or reservoir at a substantially constant rate, i.e., distance per unit time.

It is preferred that the liquid medium including the plant derived aromatic containing component, etc., noted herein, may be injected into the reservoir in slugs, for example, alternating liquid medium and/or polymer drive/pusher slugs. The amounts of liquid medium and drive fluid injected into the reservoir may vary widely, depending on various factors, provided that such amounts and proportions act to provide for hydrocarbon recovery. If the liquid medium is injected as slugs, the size of the individual slugs of liquid medium injected preferably range up to about 10%, more preferably up to about 50%, of the reservoir pore volume.

The conditions at which the present contacting in the subterranean reservoir occurs may vary widely. In certain EOR processing applications, it may not be possible to effectively control the temperature and/or pressure of the subterranean reservoir during the contacting step and/or to effectively control the time during which the contacting occurs.

The present process provides for substantial hydrocarbon recovery without requiring the use of relatively expensive surfactants, such as those used and/or proposed for chemical flooding. Also, substantially no additional hydrocarbon need be injected. Thus, the present process involves less cost and may have improved effectiveness at elevated reservoir temperatures relative to process using chemical flooding process. In certain applications, the injection or one or more surfactants, polymers or foams, such as those conventionally used in EOR processing, may have a beneficial effect on the recovery of hydrocarbons in the present invention.

The following non-limiting examples illustrate certain of the advantages of the present invention.

EXAMPLE 1

A crude petroleum bearing, porous reservoir is produced, using conventional primary recovery methods, until it is determined that enhanced oil recovery is needed to effectively and economically produce the reservoir further. Injection wells into the reservoir are strategically located, in a conventional manner, relative to the producing wells so that fluid injected in the injection wells would tend to sweep crude petroleum remaining in the reservoir toward the production wells for recovery.

Seawater (brine) is injected into the reservoir through the injection wells. A quantity of crude petroleum is recovered. This waterflood/crude petroleum recovery continues until it is determined that additional enhanced oil recovery is needed to effectively and economically produce the reservoir further.

A combination of brine, sodium lignosulfonate having ortho-quinone functionality, sufficient sodium hydroxide to provide a pH of about 11 is prepared. A concentration of 0.5% percent by weight of a sodium lignosulphonate which had been produced by an acid bisulfite pulping process is used. The sodium lignosulphonate had been processed to reduce the reducing sugar content to 0.1 wt/percent. The lignosulphonate further had the following chemical properties: 16.1% sodium, 0.5% calcium, 1.5% sulphate sulfur, 2.5% wt/pct non-sulphonate sulfur, 8.9% sulphonate sulfur, 11.4% total sulfur, 4.5% methoxy, and contained catechol functionality. Prior to the addition of the sodium lignosulphonate component, a 45 wt/percent aqueous solution of the sodium lignosulphonate was sparged with air at a temperature of 35° C. for a period of time of 30 minutes at a pH of 12 adjusted with sodium hydroxide. The air sparging oxidized residual catechol functionality to the ortho-quinone functionality. This combination is injected as a slug into each of the injection wells, in amounts so that a total of about 50% by volume of the pore space of the reservoir of the combination is injected. This injection is followed by a mixture of polymer and water, optionally with air which is injected into each of the injection wells. The pH of the reservoir is controlled at about 11 by addition of sodium hydroxide. A quantity of crude petroleum is economically recovered.

EXAMPLE 2

A crude petroleum-bearing, porous reservoir is produced, using conventional primary recovery methods, until it is determined that enhanced oil recovery is needed to effectively and economically produce the reservoir further. Injection wells into the reservoir are strategically located, in a conventional manner, relative to the producing wells so that fluid injected in the injection wells would tend to sweep crude petroleum remaining in the reservoir toward the production wells for recovery.

Seawater (brine) is injected into the reservoir through the injection wells. A quantity of crude petroleum is recovered. This waterflood/crude petroleum recovery continues until it is determined that additional enhanced oil recovery is needed to effectively and economically produce the reservoir further.

A combination of brine, a sodium lignosulfonate as set forth in Example 1, and sufficient sodium hydroxide to provide a pH of about 11 is injected into the reservoir through the injection wells. Oxygen is dissolved in the aqueous medium to regenerate reduced ortho-quinone containing lignosulfonate. An initial high acid number of the petroleum in the reservoir is not required. The petroleum acids and other reaction by-products generated from the crude oil react with the alkaline combination resulting in in situ generation of surfactants. The oxidative cracking of petroleum in the reservoir may help change crude oil mobility and recovery through oxidative viscosity reduction.

The injection of this alkaline combination is followed by a mixture of polymer and water which is injected into each of the injection wells. The pH of the reservoir is controlled at about 11 by addition of sodium hydroxide. A quantity of crude petroleum is economically recovered.

The use of the present EOR process does not require that the porous reservoir be previously waterflooded or subjected to any other EOR process. Good results are obtained if the present process is used on a reservoir directly after primary recovery methods are used. In certain situations, the present process may be employed without first using such primary production techniques.

While this invention has been described with respect to various specific examples and embodiments, it is to be understood that the invention is not limited thereto and that it can be variously practiced within the scope of the following claims.

What is claimed is:

1. A process for recovering hydrocarbons from a subterranean hydrocarbon-bearing reservoir comprising:

contacting said reservoir with at least one added plant derived aromatic component having ortho-quinone functionality wherein the ortho-quinone functionality is present in the component in the range of from at least about 1 weight percent to about 40 weight percent of the total weight of the plant derived aromatic component and mixtures thereof, said contacting occuring at conditions effective to chemically modify components of said hydrocarbons in said reservoir; and recovering hydrocarbons from said reservoir.

2. The process of claim 1 wherein the plant derived aromatic component is selected from the group consisting of lignin, tannin and mixtures thereof.

3. The process of claim 2 wherein the plant derived aromatic component is lignin.

4. The process of claim 2 wherein the plant derived aromatic component has water solubilizing groups selected from the group consisting of sulfonate salts, phenolate salts, carboxylate salts and mixtures thereof.

5. The process of claim 4 wherein the plant derived aromatic component is selected from the group consisting of a sodium lignosulfonate, a sodium lignin and mixtures thereof.

6. The process of claim 5 wherein the plant derived aromatic component is a sodium lignosulfonate.

7. The process of claim 3 wherein the ortho-quinone functionality is present in the component in the range of from at least about 2 weight percent to about 30 weight percent of the total weight of the plant derived aromatic unit.

8. The process of claim 5 wherein the ortho-quinone functionality is present in the component in the range of from at least about 2 weight percent to about 30 weight percent of the total weight of the plant derived aromatic unit.

9. The process of claim 1 wherein said plant derived aromatic component is present in an aqueous soluble catalytic amount to at least promote the oxidation of the hydrocarbons and an additional oxidant is present to provide at least one of the following: (1) form and cycle said plant derived aromatic component between ortho-quinone and catechol oxidation states and (2) cycle said plant derived aromatic component between ortho-quinone and catechol oxidation states.

10. The process of claim 6 wherein said plant derived aromatic component is present in an aqueous soluble catalytic amount to at least promote the oxidation of the hydrocarbons and an additional oxidant is present to provide at least one of the following: (1) form and cycle said plant derived aromatic component between ortho-quinone and catechol oxidation states and (2) cycle said plant derived aromatic component between ortho-quinone and catechol oxidation states.

11. The process of claim 8 wherein said plant derived aromatic component is present in an aqueous soluble catalytic amount to at least promote the oxidation of the hydrocarbons and an additional oxidant is present to provide at least one of the following: (1) form and cycle said plant derived aromatic component between ortho-quinone and catechol oxidation states and (2) cycle said plant derived aromatic component between ortho-quinone and catechol oxidation states.

12. The process of claim 9 wherein the oxidant is oxygen and the contacting is in the presence of an aqueous medium at a pH in the range of from about alkaline to about 13.

13. The process of claim 10 Wherein the oxidant is oxygen and the contacting is in the presence of an aqueous medium at a pH in the range of from about alkaline to about 13.

14. The process of claim 11 wherein the oxidant is oxygen and the contacting is in the presence of an aqueous medium at a pH in the range of from about alkaline to about 13.

15. The process of claim 4 wherein the salt is a sodium salt.

16. The process of claim 4 wherein the ortho-quinone functionality is present in the component in the range of from at least about 2 weight/percent to about 25 weight/percent of the weight of the plant derived aromatic component.

17. The process of claim 5 wherein the ortho-quinone functionality is present in the component in the range of from at least about 2 weight/percent to about 25 weight/percent of the weight of the plant derived aromatic component.

18. The process of claim 6 wherein the ortho-quinone functionality is present in the component in the range of from at least about 2 weight/percent to about 25 weight/percent of the weight of the plant derived aromatic component.

19. The process of claim 13 wherein the ortho-quinone functionality is present in the component in the range of from at least about 2 weight/percent to about 25 weight/percent of the weight of the plant derived aromatic component.

20. The process of claim 9 wherein the plant derived aromatic component is lignin water solubilizing groups selected from the group consisting of sulfonate salts, phenolate salts, carboxylate salts and mixtures thereof and the salt is a sodium salt.

* * * * *